US012215525B2

(12) United States Patent
Scaletta et al.

(10) Patent No.: US 12,215,525 B2
(45) Date of Patent: Feb. 4, 2025

(54) LOCKING DEVICE AND METHOD FOR SECURING CARGO DOOR

(71) Applicant: Thunderbolt Locks Inc., Lyons, IL (US)

(72) Inventors: John Scaletta, La Grange Highlands, IL (US); James Jessup, Burr Ridge, IL (US)

(73) Assignee: Thunderbolt Locks., Inc., Lyons, IL (US)

( * ) Notice: Subject to any disclaimer, the term of this patent is extended or adjusted under 35 U.S.C. 154(b) by 9 days.

(21) Appl. No.: 18/118,747

(22) Filed: Mar. 8, 2023

(65) Prior Publication Data

US 2024/0301723 A1 Sep. 12, 2024

(51) Int. Cl.

*E05B 65/00* (2006.01)
*E05B 35/00* (2006.01)
*E05B 63/12* (2006.01)

(52) U.S. Cl.

CPC ........ *E05B 65/0021* (2013.01); *E05B 35/008* (2013.01); *E05B 63/123* (2013.01)

(58) Field of Classification Search

CPC ........ E05B 35/00; E05B 35/008; E05B 63/00; E05B 63/123; E05B 65/00; E05B 65/0021
USPC .............................................................. 70/99
See application file for complete search history.

(56) References Cited

U.S. PATENT DOCUMENTS

| | | | | | |
|---|---|---|---|---|---|
| 4,073,517 | A * | 2/1978 | Bills | E05B 65/0864 | 292/DIG. 46 |
| 4,669,282 | A * | 6/1987 | Hoyt | E05B 63/0052 | 70/380 |
| 4,782,674 | A * | 11/1988 | Johnson | E05C 3/16 | 70/95 |
| 2004/0055345 | A1* | 3/2004 | Moore | E05B 81/70 | 70/257 |
| 2005/0044793 | A1* | 3/2005 | Hormann | E05B 65/0021 | 49/197 |
| 2016/0356061 | A1* | 12/2016 | Gledhill | E05B 65/087 | |
| 2017/0328130 | A1* | 11/2017 | Baker | G07C 9/00 | |

FOREIGN PATENT DOCUMENTS

| | | | | |
|---|---|---|---|---|
| CN | 104989264 | A | * | 10/2015 |
| DK | 180285 | B1 | * | 10/2020 |

* cited by examiner

*Primary Examiner* — Nathan Cumar
(74) *Attorney, Agent, or Firm* — Garbis Law, LLC; Anastasios G. Garbis

(57) ABSTRACT

A locking device for preventing a cargo door from opening. The locking device includes an anchor fitting, a locking bolt and a key tool. The anchor fitting can be installed through the exterior wall of a cargo vehicle and has an elongated body and a hollow portion to receive the locking bolt. When fully inserted through the anchor fitting, the locking bolt is tightened by the key tool and extends through the anchor fitting to block the movement of the cargo door.

13 Claims, 7 Drawing Sheets

LOCKING DEVICE AND METHOD FOR SECURING CARGO DOOR

FIELD OF INVENTION

The present invention relates generally to a locking device, and, more particularly, to a locking device and method for preventing the opening of a door, such as the rolling door of a box truck or cargo van.

BACKGROUND OF INVENTION

Roll-up doors are commonly used on cargo carrying vehicles such as box trucks, vans, trailers, and the like, to provide access to the bodies of said vehicles. They can also be used on other structures, such as garages, containers or storage facilities.

These doors typically are carried on rollers and guided along a set of channeled roller tracks. To keep them from opening, some type of latching mechanism is generally used, often combined with a locking mechanism to prevent unauthorized access into the cargo area. One of the more common locking mechanisms used is a padlock, which releasably holds the latch in an engaged position.

Unfortunately, break-ins to cargo-carrying vehicles are a common occurrence and can be done by cutting the padlock, or other locking mechanism, to gain access to valuable cargo secured within the vehicle. Cargo thieves will often target vehicles that are parked in unsecured areas, such as rest areas or truck stops, as well as parked on streets, truck yards or distribution centers. They will typically cut the padlock that secures the roll-up door of the vehicle and quickly make off with the contents of the trailer.

Accordingly, there is a need for a secondary locking method which would hinder a thief's ability to gain access to the items stored within the body of the vehicle if the primary locking mechanism is compromised. It would also be beneficial if this locking method was not easily identified by a potential thief to increase the total time it would take to attempt to gain access to the cargo.

SUMMARY OF THE INVENTION

Systems and methods implementing a locking device are disclosed herein. According to one aspect of the invention, a locking device is provided. The locking device includes an anchor fitting, a locking bolt and key tool. The anchor fitting includes a head forming a flange and has an elongate body with a hollow portion throughout. An entrance opening and an exit opening at two ends of the hollow portion is provided. The hollow portion consists of a hexagonal section, a threaded section, and a cylindrical section. The hexagonal section is located at the entrance opening of the anchor fitting and is followed by the threaded section. The cylindrical section of the hollow portion is located on the exit opening of the anchor fitting. The outer surface of the anchor fitting includes outer threads running the full length of the anchor body from the flange to the exit opening. According to another aspect of the invention, the inner threads located in threaded second section of the hollow portion of the anchor fitting may consist of 16 threads per inch. According to another aspect of the invention, the outer threads located on the outer surface of the anchor may consist of twenty-four threads per inch.

A locking bolt, having a first end and second end, is adapted to be inserted and threaded into the hollow portion of the anchor fitting. The locking bolt consists of a bolt head at the first end with a key insert adapted to receive the key tool. In some embodiments, the key insert can be hexagonally shaped, but it is not limited to this. The key insert and key tool can be various tamper proof shapes meant to prevent the use of common tools to unthread locking bolt. The locking bolt is generally cylindrical, with the threaded portion near the first end. At least two pin slots are located towards the second end of the threaded locking bolt on opposites sides of each other. The pin slots are adapted to hold ball pins. Each of the ball pins can be slidably disposed and moved to an in position and an out position. As the threaded locking bolt is inserted into the anchor fitting, the ball pins are squeezed in and maintain tension within the anchor. One benefit of the ball pins is that the locking bolt can remain in the anchor without falling out of it if not fully tightened. This allows a user to unthread the locking bolt to open the door without having to completely remove the locking bolt as the ball pins create enough tension to keep the locking bolt in position within the anchor when loosened. Once the threaded locking bolt has been inserted and threaded into the anchor fitting and the second end of the threaded locking bolt has made its way passed the exit opening of the anchor fitting, the ball pins are released to the out position. The threaded locking bolt can move upwardly and downwardly into the anchor fitting as expected.

In some embodiments, the second end of the threaded locking bolt is tapered.

The key tool consists of a body with a first end and second end, and an arm protruding perpendicularly from the body. The end of the arm is formed as a socket which is adapted to act as the key to unlock the threaded locking bolt. In some embodiments, the end socket has a hexagonal shape with a cylindrical bore and is adapted to fit into the key insert of the locking bolt head. The first end of the key tool has an aperture cut through its surface which can act as a key ring attachment. The overall shape of the key tool as a “T” or an “L” allows for adequate leverage to tighten and loosen the threaded locking bolt.

According to another aspect of the invention, a method for securing a roll-up door is described. The method includes drilling a hole through the exterior of the cargo vehicle and into the roller track of the door at the desired position. Once the hole is drilled, the anchor fitting is inserted into the hole and secured by its threads. The threaded locking bolt is then placed into the anchor fitting and tightened using the key tool. When not fully tightened, the ball pins will hold the locking bolt in place within the anchor fitting. Once the locking bolt has been fully tightened and its second end has made it through the anchor fitting, the threaded locking bolt will be secured, preventing the door from being able to be opened. To remove the locking bolt the provided key tool must be used to unscrew the locking bolt from the anchor fitting. Multiple locking devices may be installed along the roller track on either side of the door.

The locking device may be constructed of stainless steel or other material of suitable strength and hardness, either metallic or non-metallic.

The foregoing and other objectives, features and advantages of the invention will be more fully understood from the following description taken in conjunction with the accompanying drawings.

DETAILED DESCRIPTION

Reference will be made in detail to exemplary embodiments and methods of invention as illustrated in the accompanying drawings. It should be noted, however, that the invention in its broader aspects is not limited to the specific details, representative devices and methods, and illustrative examples shown and described in connection with the exemplary devices and methods. It is to be understood that the features illustrated or described in connection with one exemplary embodiment may be combined with another and such modifications and variations are intended to be included within the scope of the present invention.

Figure 1:
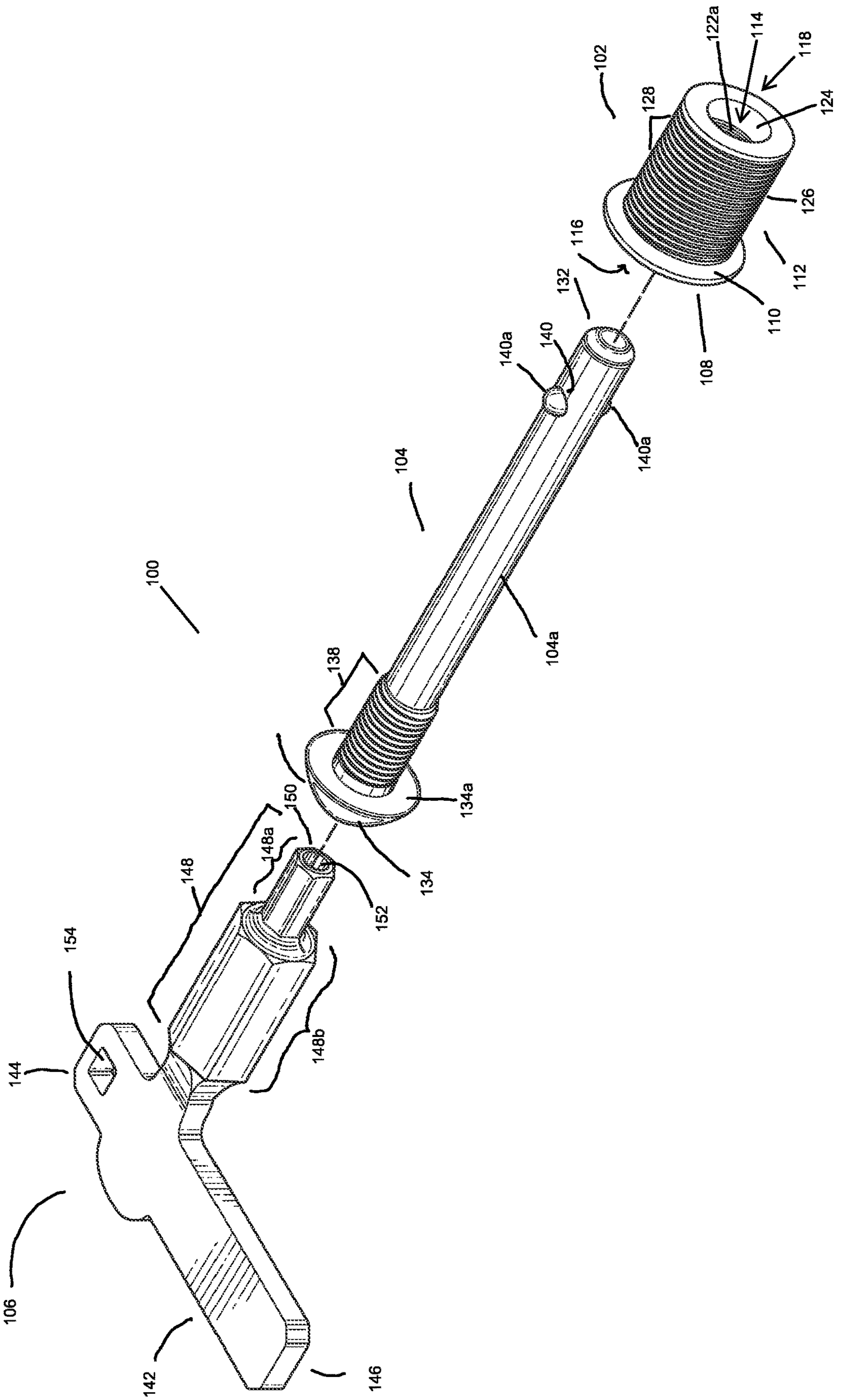
FIG. 1 is a perspective view of the locking device showing the key tool, locking bolt, and anchor fitting.
Figure 2:
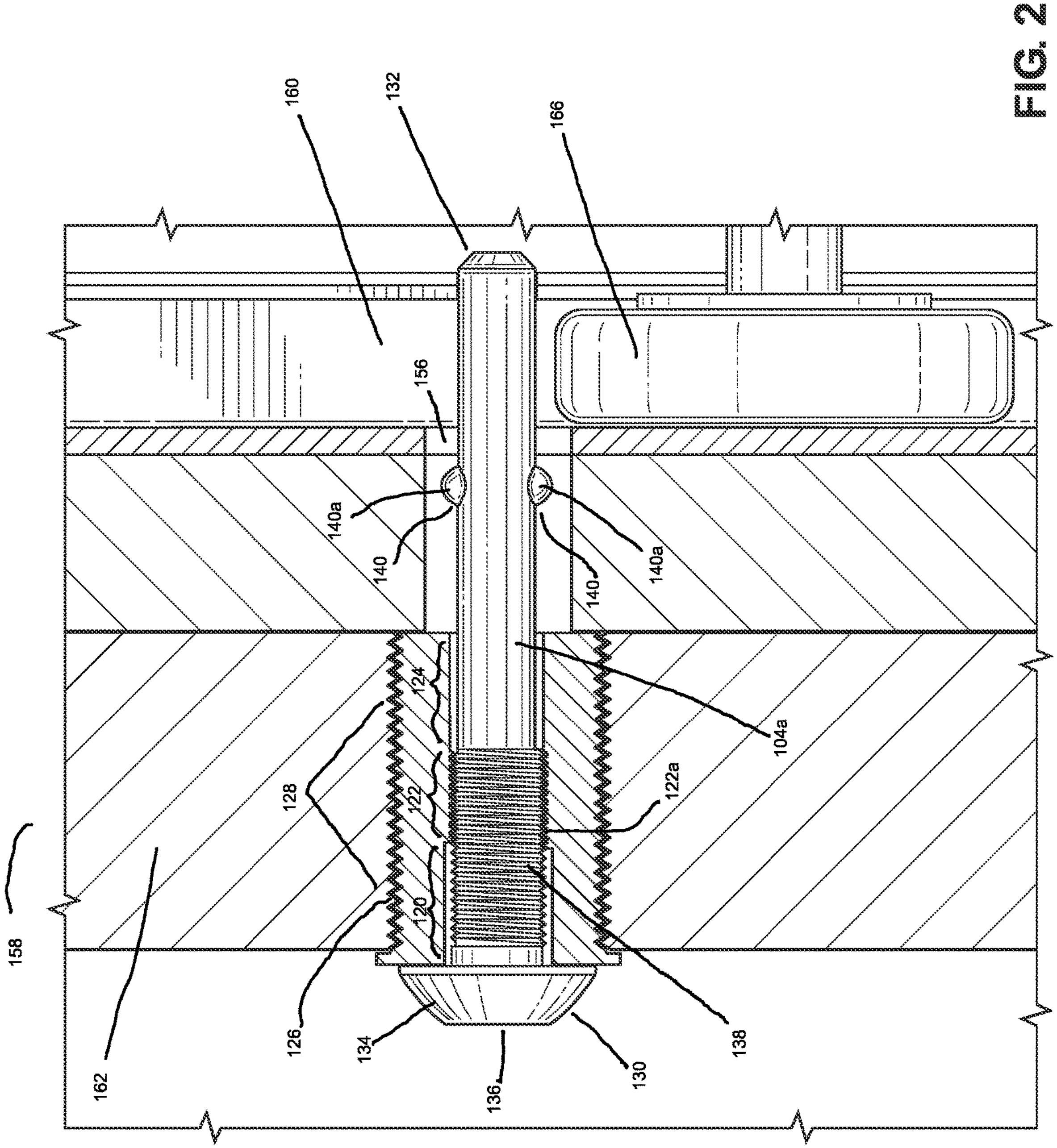
FIG. 2 shows a cut-away cross-section view of the preferred embodiment of the present system fully installed.

FIG. 1 illustrates a locking device 100. The locking device 100 includes an anchor fitting 102, a locking bolt 104 and a key tool 106. The locking device 100 is made of metal, such as stainless steel, or any other material of suitable strength and hardness, either metallic or non-metallic. The anchor fitting 102 is generally cylindrical forming an elongate body 112 with a hollow portion 114 bored through the length of the elongate body 112, resulting in an entrance opening 116 on one end of the anchor fitting 102 and an exit opening 118 on the other end. The anchor fitting 102 consists of a head 108 forming a flange 110 at the entrance opening 116. The hollow portion 114 of the anchor fitting 102 is split into a hexagonal section 120, a threaded section 122 and a cylindrical section 124, as shown in FIG. 2. The hexagonal section 120 is located at the entrance opening 116 of the anchor fitting 102 and is meant to receive a torquing device to install the anchor fitting at a desired position. It should be noted that the shape of the hexagonal section 120 can vary as any suitable torquing shape would be acceptable in practicing the invention. Internal threads 122*a* are located in threaded section 122 of the hollow portion 114 of the anchor fitting 102 to secure the locking bolt 104 to the anchor fitting 102. The elongate body 112 has an outer surface 126 consisting of outer threads 128 to secure the anchor fitting 102 to a hole 156 drilled through the exterior of a cargo vehicle 158 and into a roller track 160.

Figure 3:
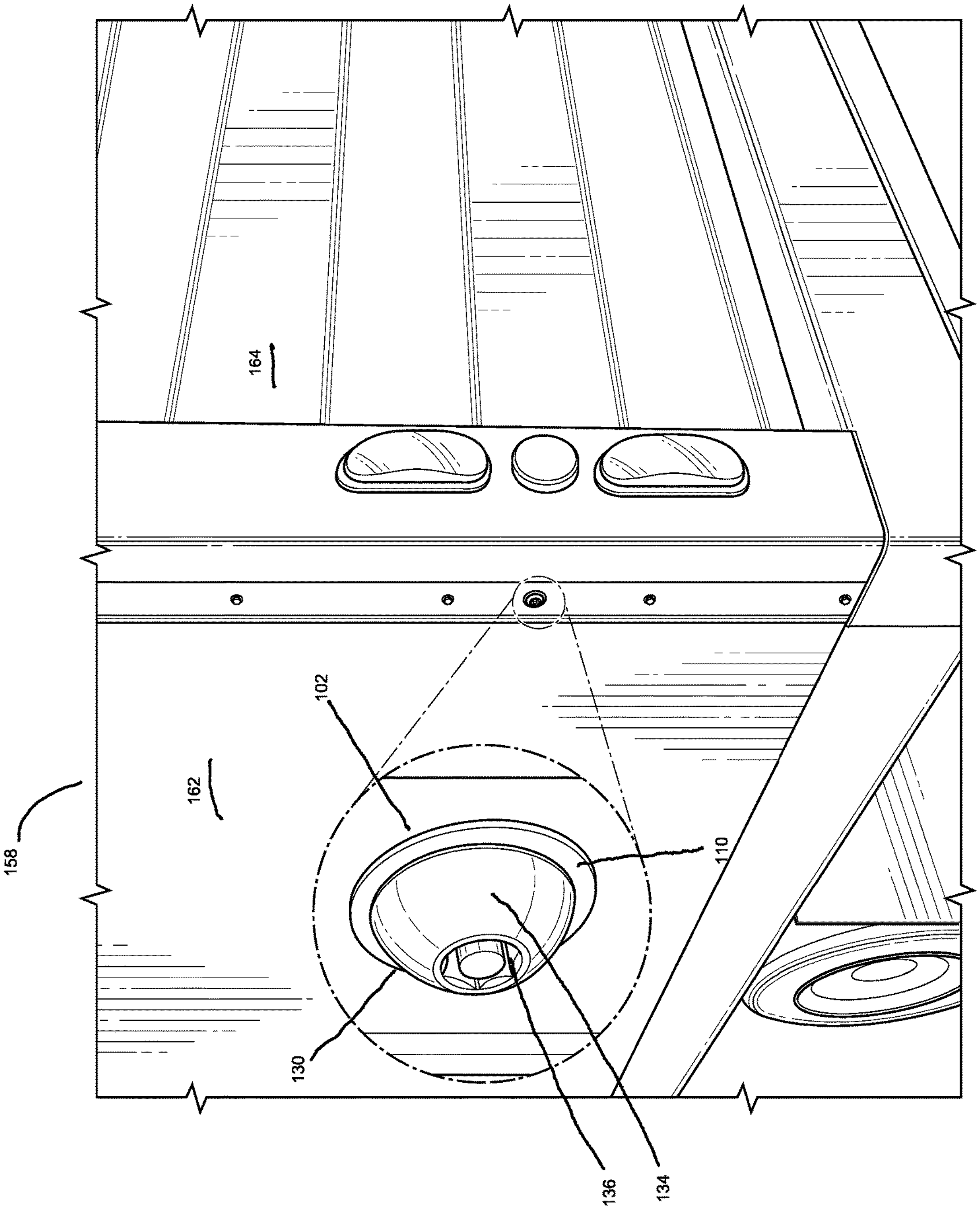
FIG. 3 shows a fully installed close-up view of the outside of the cargo vehicle with the preferred embodiment of the present invention installed.

The locking bolt 104 includes a bolt body 104*a* with a first end 130 and a second end 132, and a bolt head 134. The bolt body 104*a* is formed with a threaded portion 138 on an external surface of the bolt body 104*a* at the first end 130 below the bolt head 134. The bottom of the bolt head 134 is formed with a flat face 134*a* to sit flush on the flange 110 of the anchor fitting 102 when secured. As depicted in FIG. 3, the bolt head 134 includes a key insert 136 to receive the end socket 150 of the key tool 106. In this embodiment, the shapes of the key insert 136 and end socket 150 are generally hexagonal. Of course, those components need not be hexagonal in shape. At least two pin slots 140 are positioned towards the second end 132 of the bolt body 104*a* and each house a ball pin 140*a* which can be slidably disposed into and out of the pin slots 140.

The key tool 106 includes a key tool body 142 with a key tool first end 144 and a key tool second end 146. An arm 148 protrudes perpendicularly off of the key tool body 142 and includes an arm end 148*a* and an anchor torquing section 148*b*. In this embodiment, the arm end 148*a* has a hexagonal shape with a cylindrical bore 152 through the tip of the arm to form an end socket 150. Preferably, the anchor torquing section 148*b* is the same size and shape as the entrance opening 116 of the anchor fitting 102 and is meant to be used to install and tighten the anchor fitting 102 into the cargo vehicle 158. In this embodiment, the end socket 150 functions as the key to be inserted into the key insert 136 of the locking bolt 104. The first end 144 of the key tool body 142 includes an aperture 154 cut through its surface, which can be used to attach to a key ring. In one embodiment, the aperture 154 is square shaped.

FIG. 3 shows a close-up view of the fully installed locking device 100 from the exterior of a cargo vehicle 158. When fully installed, the flange 110 of the anchor fitting 102 sits flush with the exterior of the cargo vehicle 158. In the fully installed position, the locking bolt 104 sits flush on top of the flange 110 of the anchor fitting 102. The key insert 136 on the bolt head 134 is sized and shaped to receive the end socket 150 of the key tool 106. A major benefit of the locking device 100 is that it is not obvious to an intruder. Instead of utilizing a padlock, or other locking mechanism, which is in plain sight and can be compromised, the locking device 100 prevents the cargo door 164 from moving from the inside, but it is accessible for the user from the outside. It is not obvious to a potential intruder as to what is hindering the cargo door 164 from opening, because the bolt head 134 blends in with other nuts and bolts which may be located on the cargo vehicle 158.

Figure 4:
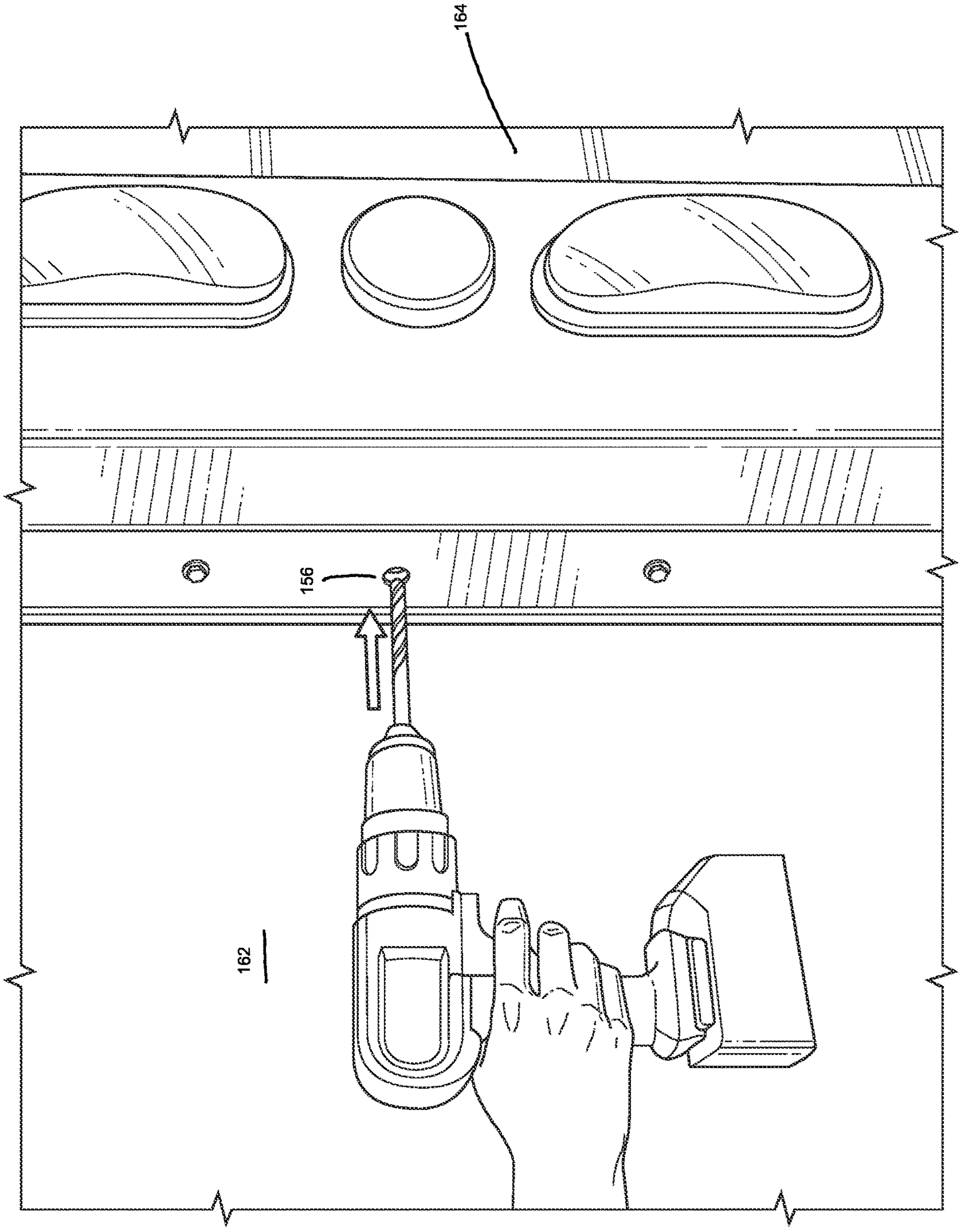
FIG. 4 is a pictorial view of the hole to receive the anchor fitting of the preferred embodiment of the present invention being drilled.
Figure 5:
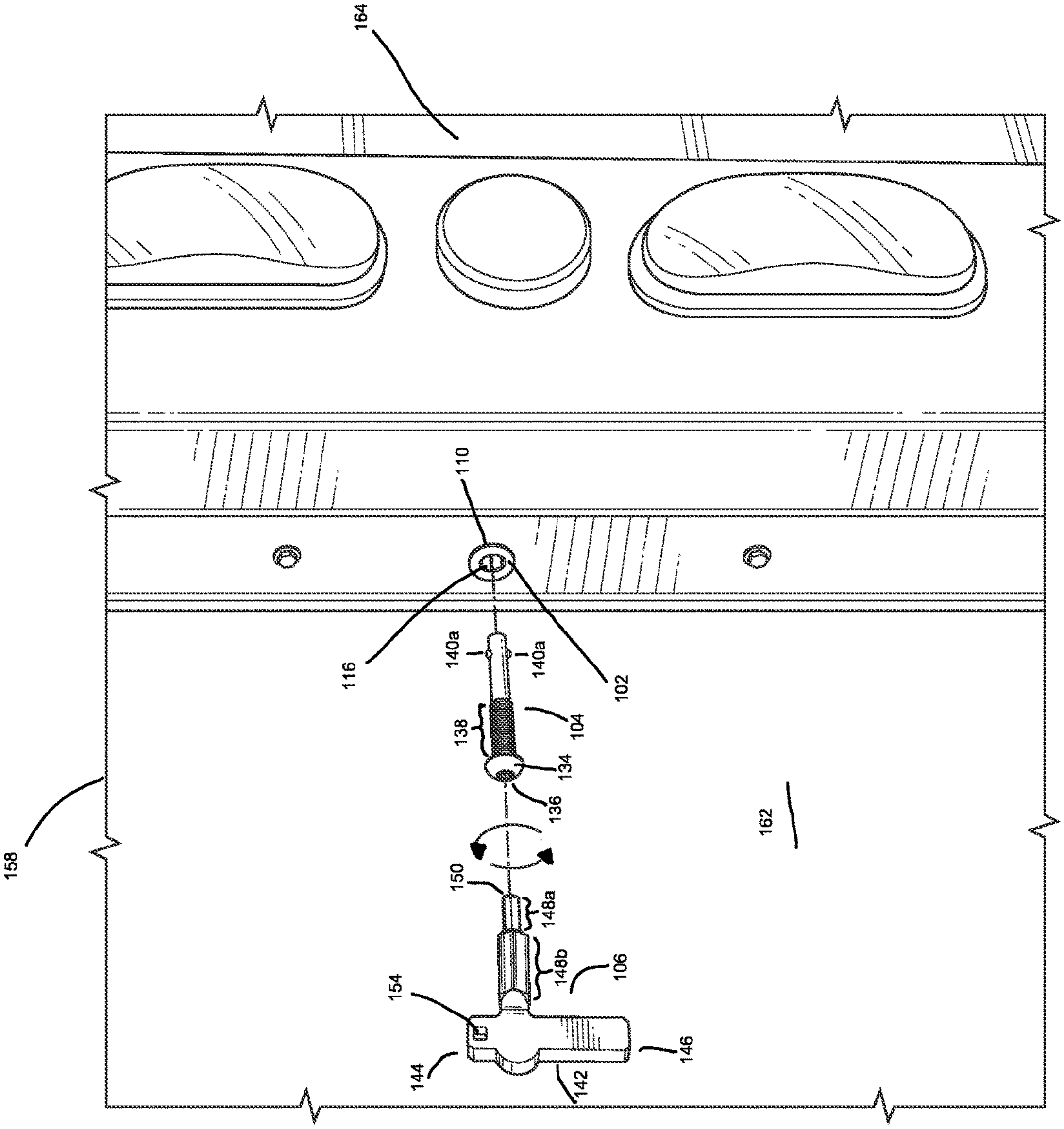
FIG. 5 is a pictorial view of the exterior of the cargo vehicle with the anchor fitting of the present system installed and an exploded view of the locking bolt and key tool of the present system.

FIGS. 4 and 5 show the installation of the locking device 100 to secure the cargo door 164 of a cargo vehicle 158, such as a box truck. A hole 156 is first drilled through the exterior wall 162 of a cargo vehicle 158 and through the roller track 160 that carries the cargo door 164 at the desired position. Depending on the material of the exterior wall 162, it may be appropriate to tap and thread the hole 156 in order to receive the anchor fitting 102. The anchor fitting 102 is then threaded into the hole 156 and tightened by inserting the arm 148 of the key tool 106 through the entrance opening 116 of the anchor fitting 102 until the anchor torquing section 148*b* of the arm 148 is received by the hexagonal section 120 of the anchor fitting 102. The key tool 106 can then be used to tighten the anchor fitting 102 until it is secured. Once the anchor fitting 102 has been secured, the locking bolt 104 is inserted into the anchor fitting 102 and tightened by inserting the end socket 150 of the key tool 106 into the key insert 136 of the locking bolt 104. In its preferred embodiment, the threaded portion 138 of the locking bolt 104 and the threaded section 122 in the hollow portion 114 of the anchor fitting 102 allow the locking bolt 104 to be threaded and tightened in a counterclockwise direction to make it less obvious to potential thieves.

Figure 6:
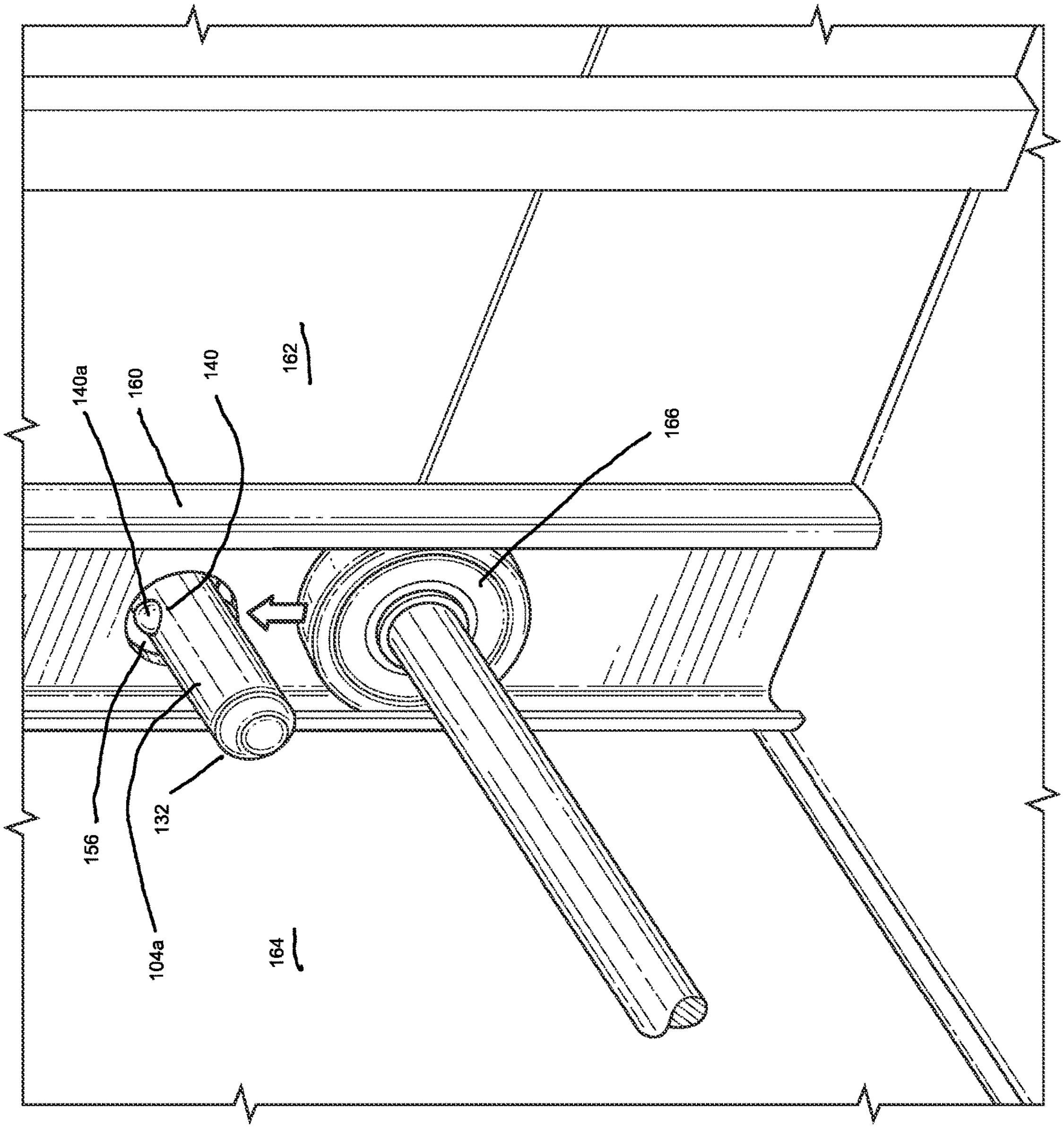
FIG. 6 is an interior view of the cargo vehicle showing the rolling track and the locking device fully installed.

FIG. 6 shows the fully installed locking device 100 with the locking bolt 104 protruding through the hole 156 drilled through the roller track 160. The overall length of the locking bolt 104 can vary, but it must be at least long enough to reach through the exterior wall 162 of the cargo vehicle 158 and the roller track 160 with enough length left over to prevent the rollers 166 of the cargo door 164 to move passed it. The position of the hole 156 in the roller track 160 will determine how far along the track the door will travel when the locking device 100 is installed. In another embodiment, multiple locking devices 100 can be utilized if additional holes are drilled into the roller track 160.

Figure 7:
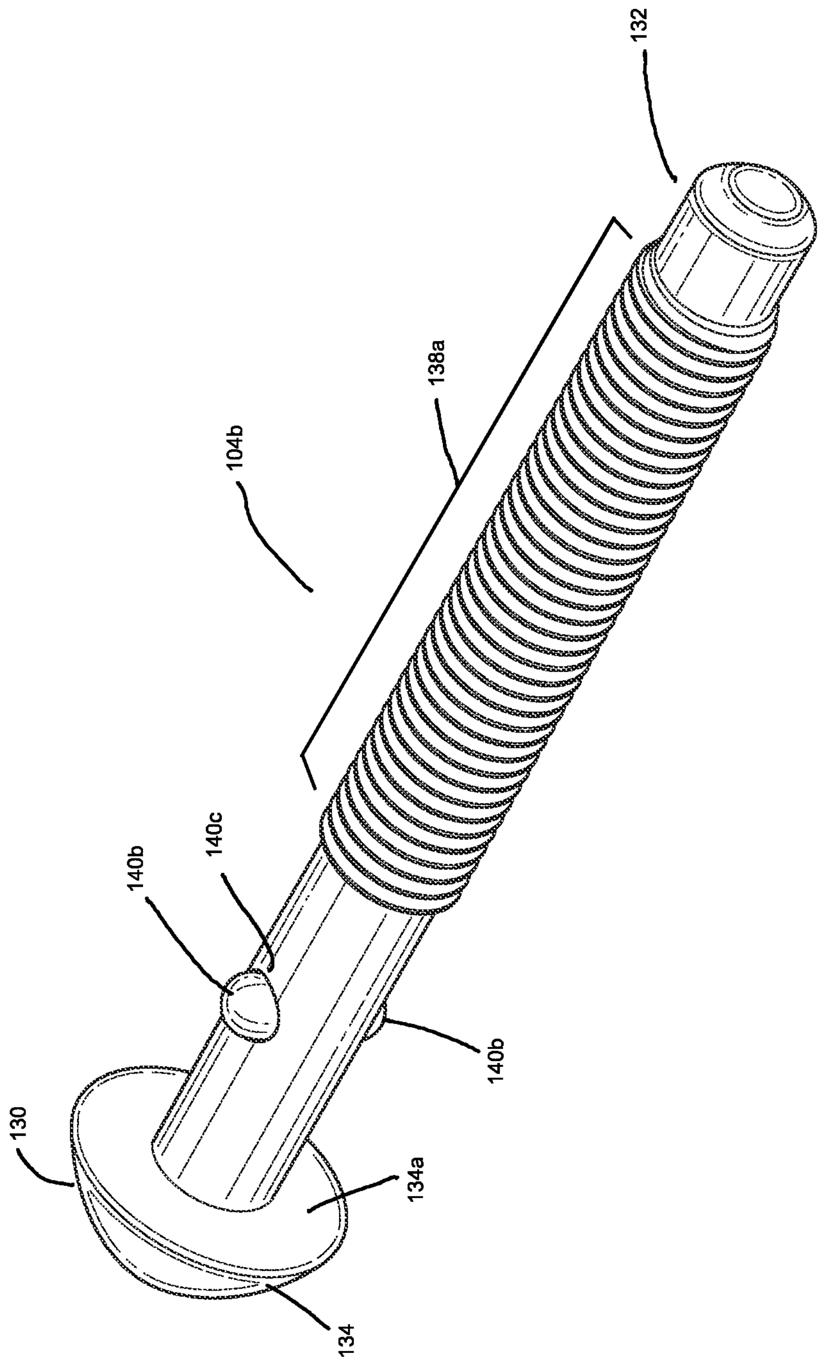
FIG. 7 is a perspective view of an alternative embodiment of the locking bolt.

FIG. 7 shows a different embodiment of the locking bolt 104*b* for the locking device 100. The locking device 100 has been described for cargo vehicles utilizing roll-up doors, but it may also be utilized with other types of vehicles, structures and doors with similar features, such as trailer vehicles with swinging doors. In this embodiment, the threaded portion 138*a* and the ball pins 140*b* are switched, with the ball pins 140*b* below the bolt head 134 at the first end 130 and the threaded portion 138*a* starting below the ball pins 140*b* running to the second end 132 of the locking bolt 104*b*.

What is claimed is:

1. A locking device comprising:

an anchor fitting having an elongated body with a hollow portion forming an entrance opening and an exit opening, a head on one end of the elongated body forming a flange, and an outer surface with a plurality of outer threads;

a locking bolt with a bolt body having a first end and a second end, with a bolt head and a threaded portion located at the first end along and at least two pin slots located towards the second end to house at least two ball pins;

A key tool having a body with a first end and a second end with an arm protruding from the body, the arm consisting of an arm end and an anchor torquing section adapted to tighten the locking bolt and anchor fitting, respectively.

2. The locking device of claim 1 wherein the hollow portion of the anchor fitting comprises a hexagonal section for receiving the key tool, a threaded section for receiving the locking bolt and a cylindrical section.

3. The locking device of claim 1 wherein the bolt head comprises a key insert to receive the key tool.

4. The locking device of claim 1 wherein at least two pin slots are located towards the second end.

5. The locking device of claim 4 wherein at least two ball pins are housed in the at least two pin slots.

6. The locking device of claim 1 wherein the second end of the bolt body is tapered.

7. The locking device of claim 1 wherein the arm end of the key tool has a hexagonal shape with a cylindrical bore.

8. The locking device of claim 1 wherein the anchor torquing section of the key tool has a hexagonal shape.

9. A method of implementing a locking device for securing a cargo door, the method comprising:

a. drilling a hole through an exterior wall of a cargo vehicle and a roller track used to guide the cargo door, b. using a tap to thread the hole with internal threads;

c. inserting an anchor fitting into the hole and tightening by inserting a key tool through an entrance opening of the anchor fitting;

d. inserting a locking bolt into the anchor fitting and tighten with the key tool until it is secure.

10. The method of claim 9, wherein multiple holes are drilled to install multiple locking devices.

11. The method of claim 9, wherein the locking bolt is tightened in a counter-clockwise direction.

12. The method of claim 9, wherein the cargo door is a roll-up door.

13. The method of claim 9, wherein the cargo door is a trailer door.

* * * * *